United States Patent
Kim

(10) Patent No.: US 9,130,263 B2
(45) Date of Patent: Sep. 8, 2015

(54) COMMUNICATION TERMINAL AND ANTENNA APPARATUS THEREOF

(71) Applicant: LG INNOTEK CO., LTD., Seoul (KR)

(72) Inventor: Chang Wook Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 12 days.

(21) Appl. No.: 14/046,569

(22) Filed: Oct. 4, 2013

(65) Prior Publication Data

US 2014/0099903 A1    Apr. 10, 2014

(30) Foreign Application Priority Data

Oct. 4, 2012    (KR) .................. 10-2012-0109789

(51) Int. Cl.
H04B 1/38    (2006.01)
H01Q 9/04    (2006.01)
H04B 1/40    (2015.01)

(52) U.S. Cl.
CPC ............... *H01Q 9/0442* (2013.01); *H04B 1/40* (2013.01)

(58) Field of Classification Search
CPC ..................................................... H04B 1/3838
USPC .................................................. 455/575.5, 73
See application file for complete search history.

(56) References Cited

U.S. PATENT DOCUMENTS

| | | | |
|---|---|---|---|
| 6,731,920 B1 * | 5/2004 | Iwai et al. | 455/272 |
| 7,196,672 B2 * | 3/2007 | Iwai et al. | 343/702 |
| 7,659,793 B2 * | 2/2010 | Fukushima | 333/17.1 |
| 2005/0057399 A1 * | 3/2005 | Kipnis et al. | 343/700 MS |
| 2005/0128155 A1 * | 6/2005 | Fukuda | 343/745 |
| 2005/0200530 A1 | 9/2005 | Aikawa et al. | |
| 2007/0069956 A1 | 3/2007 | Ozkar | |
| 2011/0128200 A1 | 6/2011 | Hossain et al. | |
| 2012/0009983 A1 | 1/2012 | Mow et al. | |

FOREIGN PATENT DOCUMENTS

| | | |
|---|---|---|
| CN | 202373689 U | 8/2012 |
| GB | 2463536 A | 3/2010 |
| JP | 2009-510901 A | 3/2009 |
| JP | 2009-100156 A | 5/2009 |
| JP | 2011-114643 A | 6/2011 |
| KR | 10-2008-0038031 A | 5/2008 |
| WO | WO 2006/033199 A1 | 3/2006 |

* cited by examiner

*Primary Examiner* — April G Gonzales
(74) *Attorney, Agent, or Firm* — Birch, Stewart, Kolasch & Birch, LLP

(57) ABSTRACT

Disclosed are to a communication terminal and an antenna apparatus thereof. The antenna apparatus includes an antenna device including a feeding point to which a signal is applied; and at least one variable reactance device connected to the antenna device. The communication terminal determines a communication network to access to drive the antenna apparatus corresponding to the determined communication network, and accesses to the determined communication network through the antenna apparatus to communicate. Accordingly, a resonance frequency band of the antenna apparatus is expanded.

10 Claims, 6 Drawing Sheets

COMMUNICATION TERMINAL AND ANTENNA APPARATUS THEREOF

BACKGROUND

The embodiment relates to a communication terminal and an antenna apparatus thereof.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to a phenomenon in which voltage is induced so that current flows when a magnetic field is varied around a conductor. Although the commercialization of the electromagnetic induction technology has been rapidly progressed around small-size devices, the power transmission distance thereof is short.

In general, a wireless communication system provides various multi-media services such as a Global Positioning System (GPS), blue-tooth, and Internet. In this case, in order for the wireless communication system to easily provide the multi-media services, a high transmission rate of a large amount of data must be ensured. To this end, researches and studies have been carried out in order to improve the performance of an antenna apparatus. This is because an antenna apparatus substantially transmits/receives data in the communication terminal. The antenna apparatus may operate at the resonance frequency band to transmit/receive the data.

However, the resonance frequency band is narrow in the antenna apparatus. Accordingly, the communication terminal includes a plurality of antenna apparatuses so that the resonance frequency band may be expanded. However, since the communication terminal requires a space for installing the antenna apparatuses, it is difficult to miniaturize the communication terminal. That is, it is difficult for the communication terminal to use a relatively wide resonance frequency band through a single antenna apparatus.

SUMMARY

The embodiment provides an antenna apparatus having a relatively wide resonance frequency band. That is, the embodiment expands a resonance frequency band of the antenna apparatus while miniaturizing the antenna apparatus.

According to one embodiment, there is provided an antenna apparatus including an antenna device including a feeding point to which a signal is applied; and at least one variable reactance device connected to the antenna device.

In the antenna apparatus, the variable reactance device is connected to a position of the antenna device where a density of the signal is highest.

According to one embodiment, there is provided a communication terminal including an antenna apparatus including an antenna device and at least one variable reactance device connected to the antenna device, in which the antenna device includes a feeding point to which a signal is applied; and a control unit for controlling a strength of a signal applied to the variable reactance device according to a communication network to access and for driving the antenna apparatus to access to the communication network.

In the communication terminal, the control unit changes the communication network when a communication quality of the communication network is deteriorated lower than a preset threshold value.

According to the communication terminal and the antenna apparatus thereof of the embodiment, since the reactance of the variable reactance device may vary, the resonance frequency of the antenna apparatus may vary. Accordingly, the resonance frequency band of the antenna apparatus is expanded. Thus, the communication terminal can use an expanded resonance frequency band through a single antenna apparatus. In addition, the communication terminal may access to a plurality of communication networks. Therefore, since there is no need to install a plurality of antenna apparatuses to the communication terminal, the communication terminal may be miniaturized.

DETAILED DESCRIPTION OF THE EMBODIMENTS

Figure 1:
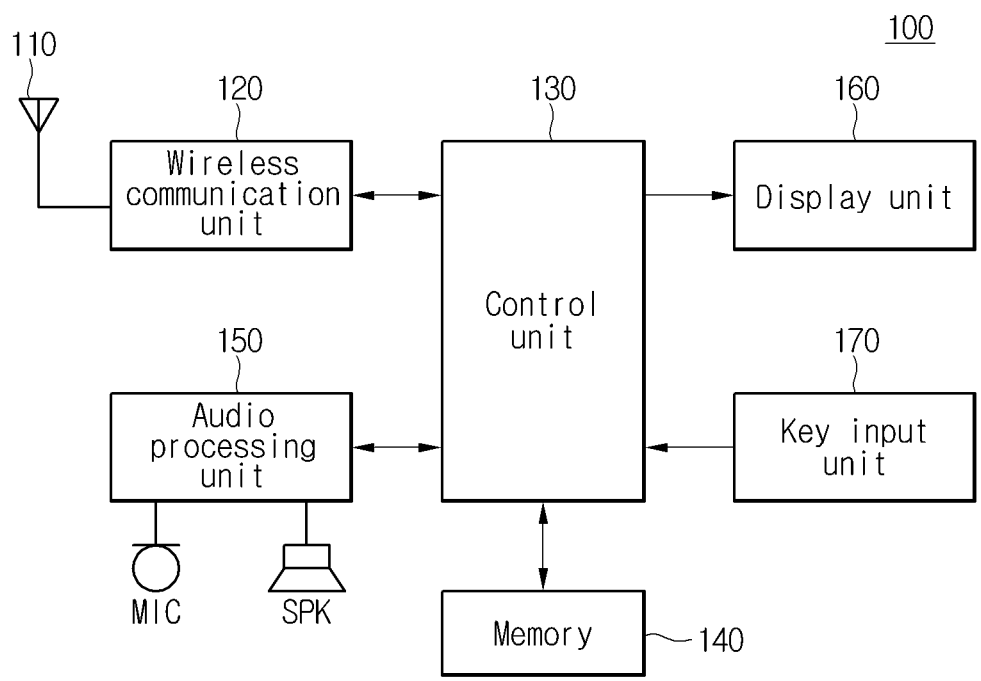
FIG. 1 is a block diagram showing a communication terminal according to the embodiment.

Hereinafter, the embodiment will be described with reference to accompanying drawings in detail. In the following description, for the illustrative purpose, the same components will be assigned with the same reference numerals, and the repetition in the description about the same components will be omitted in order to avoid redundancy. Detailed descriptions of well-known functions and structures incorporated herein may be omitted to avoid obscuring the subject matter of the present invention.

FIG. 1 is a block diagram showing a communication terminal according to the embodiment. The embodiment will be described assuming that the communication terminal is a mobile phone.

Referring to FIG. 1, the communication terminal 100 according to the embodiment includes an antenna apparatus 110, a wireless communication unit 120, a control unit 130, a memory 140, an audio processing unit 150, a display unit 160 and a key input unit 170.

The antenna apparatus 110 performs a function of wireless transceiving of the communication terminal 100. The antenna apparatus 110 wirelessly transmits a transmission signal and wirelessly receives a reception signal. In this case, the antenna apparatus 110 is operated in at least one resonance frequency band according to the embodiment. That is, the antenna apparatus 110 transceives an electromagnetic wave through at least one resonance frequency band. The antenna apparatus 110 is operated by using a signal applied thereto.

In addition, according to the embodiment, a plurality of communication networks may be accessed through the antenna apparatus 110. In this case, one of the communication networks is selectively accessed. In this case, a resonance frequency band is determined according to the electrical characteristic of the antenna apparatus 110. That is, the electrical characteristic of the antenna apparatus 110 is changed so that the resonance frequency band is changed. Thus, one of the communication networks is accessed through the antenna apparatus 110 corresponding to the resonance band.

The wireless communication unit 120 performs a wireless processing function of the communication terminal 100. The wireless communication unit 120 includes a wireless transmission unit and a wireless reception unit. The wireless transmission unit processes a transmission signal to transmit the transmission signal through the antenna apparatus. In this case, the wireless transmission unit up-converts a frequency of the transmission signal, and amplifies the transmission signal. The wireless reception unit receives and processes a reception signal. In this case, the wireless reception unit low-noise-amplifies the reception signal and down-converts a frequency of the reception signal.

The control unit 130 performs a function of controlling the overall operations of the communication terminal 100. The data processing unit includes a transmitter for coding and modulating a transmission signal and a receiver for demodulating and decoding a reception signal. In this case, the data processing unit may include a modem and a codec. Here, the codec includes a data codec for processing packet data and an audio codec for processing an audio signal such as a voice.

The control unit 130 selects one of the communication networks according to the embodiment. Further, the control unit 130 drives the antenna apparatus 110 corresponding to the communication network according to the embodiment. In addition, the control unit 130 performs communication by accessing to one of the communication networks through the antenna apparatus 110. In this case, when accessing to one of the communication networks, the control unit 130 may measure a communication quality of a specific communication network. In addition, the control unit 130 may change the determination between the communication networks according to the communication quality.

The memory 140 includes a program memory and a data memory. Programs for controlling general operations of the communication terminal 100 are stored in a program memory. In this case, the program memory stores programs for accessing to the plurality of communication networks according to the embodiment. The data memory stores data generated while executing the programs.

The audio processing unit 150 may reproduce a received audio signal output from the audio codec of the data processing unit to output the audio signal through a speaker SPK. The audio processing unit 150 may transfer the transmission audio signal generated from a microphone MIC to the audio codec of the data processing unit.

The display unit 160 displays user data output from the control unit 130. The display unit 160 may include a liquid crystal display (LCD). In this case, the display unit 160 may include an LCD control unit, an LCD memory for storing image data and an LCD display device. In a case that the display unit 160 is implemented in a touch screen scheme, the LCD may be operated as an input unit.

The key input unit 170 includes functional keys for setting or performing various kinds of functions.

Figure 2:
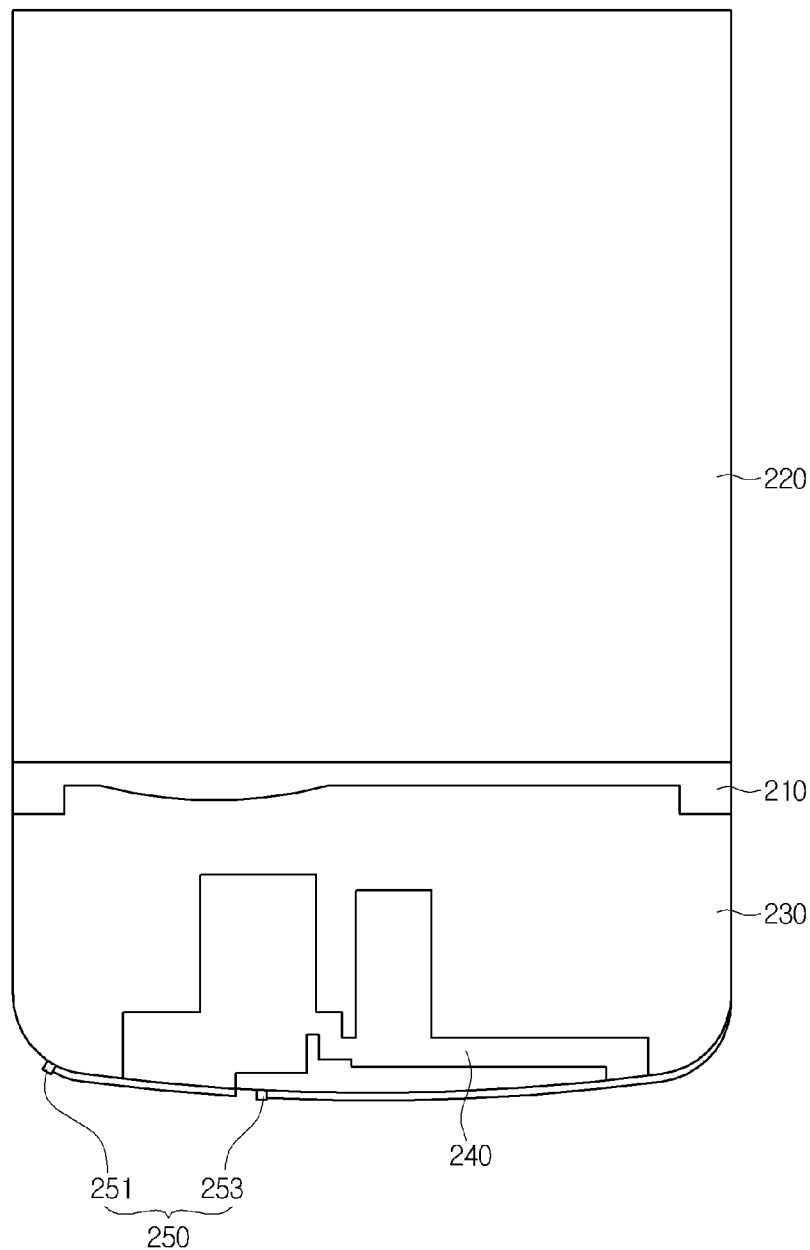
FIG. 2 is a plane view showing an antenna apparatus according to the embodiment.
Figure 3:
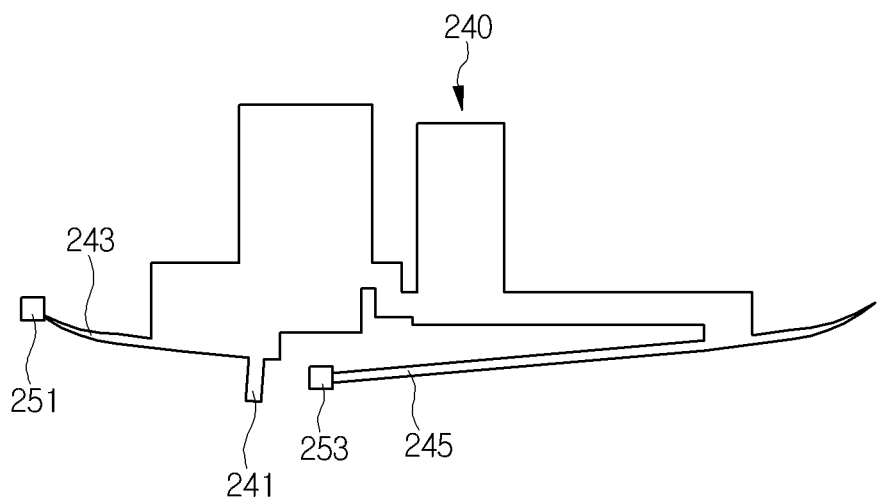
FIG. 3 is a plane view showing the antenna device and the variable reactance device of FIG. 2.

FIG. 2 is a plane view showing an antenna apparatus according to the embodiment. FIG. 3 is a plane view showing the antenna device and the variable reactance device of FIG. 2.

Referring to FIGS. 2 and 3, the antenna apparatus 110 according to the embodiment includes a drive substrate 210, a ground member 220, a mounting member 230, an antenna device 240, and at least one variable reactance device 250.

The drive substrate 210 serves as a power feeder and a supporter in the antenna apparatus 110. In this case, the drive substrate 210 may include a printed circuit board (PCB). The drive substrate 210 has a flat plate structure. In this case, the drive substrate 210 may be provided with a single substrate or may be provided by laminating a plurality of substrates.

The drive substrate 210 includes a substrate bottom surface, a substrate top surface facing the substrate bottom surface and a substrate side surface connecting the substrate top surface to the substrate bottom surface. In this case, a transmission line (not shown) is embedded in the drive substrate 210. One end of the transmission line is connected to an external power source (not shown) of the antenna apparatus 110. Further, the opposite end of the transmission line is exposed to an outside.

In addition, the drive substrate 210 includes a dielectric substance. For example, the drive substrate 210 may have the conductivity σ of 0.02 and the permittivity ∈ of 4.6. Meanwhile, the transmission line includes a conductive material. The transmission line may include at least one of silver (Ag), palladium (Pd), platinum (Pt), copper (Cu), gold (Au) and nickel (Ni).

The ground member 220 is provided for the ground of the antenna apparatus 110. That is, the ground member 220 may allow the antenna device 240 to be grounded. The ground member 220 is formed on a portion or the entire region of the drive substrate 210. In this case, the ground member 220 is spaced apart from the transmission line of the drive substrate 210. That is, the ground member 220 is not electrically connected to the transmission line. The ground member 220 may be disposed on at least one of the bottom and top surfaces of the drive substrate 210. When the drive substrate 210 may include a plurality of substrates, the ground member 220 may be interposed between the substrates.

The mounting member 230 is provided for supporting the antenna apparatus 110. That is, the mounting member 230 supports the antenna device 240. The mounting member 230 is mounted on the drive substrate 210. In this case, the mounting member 230 may be disposed on at least one of the substrate top surface and the substrate side surface of the drive substrate 210.

The mounting member 230 includes a member bottom surface, a member top surface facing the member bottom surface and a member side surface connecting the member top surface to the member bottom surface. In this case, when the mounting member 230 is disposed on the substrate top surface of the drive substrate 210, the member bottom surface may be adhere to the substrate top surface. In addition, when the mounting member 230 is disposed on the substrate side surface of the drive substrate 210, the member side surface may be adhere to the substrate side surface.

In this case, the member bottom surface and the member top surface may be formed to have the same size or mutually different sizes. In addition, the member bottom surface and the member top surface may be formed to have the same shape or mutually different shapes. Further, the member side surface may extend from the member bottom surface while being bent or curved. In addition, the member side surface may extend from the member top surface while being bent or curved. In this case, when the member bottom surface is parallel to the substrate bottom surface, the member side surface may be parallel to a vertical axis perpendicular to the substrate bottom surface or may be inclined from the vertical axis.

In addition, the mounting member 230 includes a dielectric substance. The mounting member 230 may include a dielectric substance of a high loss ratio. The mounting member 230 may be formed of the same material as that of the drive substrate 210 or may be formed of a material different from that of the drive substrate 210. For example, the mounting member 230 may have conductivity of 0.02. In addition, the mounting member 230 may have permittivity of 4.4.

The antenna device 240 is provided to substantially transceive an electromagnetic wave in the antenna apparatus 110. The antenna device 240 resonates in at least one resonance frequency band. That is, the antenna device 240 transceives an electromagnetic wave in the resonance frequency band. The antenna device 240 operates in the resonance frequency band according to a typical electrical characteristic. In this case, the typical electrical characteristic of the antenna device 240 is determined according to the structure and shape of the antenna device 240. Further, the antenna device 240 operates at predetermined impedance.

When the antenna device 240 has a plurality of resonance frequency bands, the resonance frequency bands may include a first resonance frequency band having a low frequency and a second resonance frequency band having a high frequency. The first resonance frequency band may be spaced apart from the second resonance frequency band on the frequency domain. To this end, the antenna device 240 may operate in multiple frequency bands. The first and second resonance frequency bands may be combined with each other on the frequency domain. Thus, the antenna device 240 may operate in a broad frequency band.

The antenna device 240 is mounted on the mounting member 230 of the drive substrate 210. In this case, the antenna device 240 is mounted on at least one of the member top surface and the member side surface of the mounting member 230. The antenna device 240 may be mounted on the member top surface and may be mounted on the member side surface while being bent or curved from the member top surface. Further, the antenna device 240 may be mounted on the member side surface and may be mounted on the member top surface while being bent or curved from the member side surface. The antenna device 240 adheres to the mounting member 230.

The antenna device 240 includes a plurality of ends. One of the ends of the antenna device 240 is defined as a feeding point 241. That is, the feeding point 241 makes contact with the transmission line of the drive substrate 210 in the antenna device 240. A signal for driving the antenna device 240 is applied from the transmission line to the feeding point 241. In addition, at least one of the remaining ends of the antenna device 240 is open to serve as an open end. The open end may be placed at a position where the signal density is highest in the antenna device 240. For example, the antenna device 240 may include first and second open ends 243 and 245. Additionally, at least still another one of the ends of the antenna device 240 may be defined as a ground point (not shown). That is, the ground member 220 may make contact with the ground point in the antenna device 240.

In addition, the ends of the antenna device 240 are connected to each other as a whole. The antenna device 240 may be formed in a structure or a shape including at least one of a bar type, meander type, a spiral type, a step type and a loop type. The antenna device 240 includes a conductive material. The antenna device 240 may include at least one of silver (Ag), palladium (Pd), platinum (Pt), copper (Cu), gold (Au) and nickel (Ni). In addition, the antenna device 240 may be attached to the mounting member 230 after forming a patch type. The antenna device 240 may be formed by drawing the antenna device 240 on the mounting member 230 with a conductive ink. In addition, the antenna device 240 may be patterned on the mounting member 230.

The variable reactance device 250 is provided for changing the resonance frequency band of the antenna apparatus 110. The variable reactance device 250 changes a reactance according to a strength of a signal, such as a voltage, applied from the drive substrate 210. The variable reactance device 250 may include at least one of variable capacitor and inductor. The impedance is changed corresponding to the variation of the reactance. In addition, the resonance frequency band is changed corresponding to the variation of the impedance. Thus, the variable reactance device 250 allows the resonance frequency band to be changed according to the strength of the signal applied from the drive substrate 210. Further, the variable reactance device 250 is prepared as an electronic component.

The variable reactance device 250 is mounted on the mounting member 230 in the drive substrate 210. The variable reactance device 250 is mounted on at least one of the member top surface 233 and the member side surface 235 of the mounting member 230. The variable reactance device 250 adheres to the mounting member 230.

The variable reactance device 250 is connected to the antenna device 240. Preferably, the variable reactance device 250 is connected to a portion at which the signal density is highest in the antenna device 240. In this case, the variable reactance device 250 may be connected to the open end of the antenna device 240. The variable reactance device 250 may make contact individually with the transmission line of the drive substrate 240. A signal for driving the variable reactance device 250 may be applied from the transmission line to the variable reactance device 250.

For example, the variable reactance device 250 may include first and second variable reactance devices 251 and 253. The first and second reactance devices 251 and 253 may be connected individually to the first and second open ends 243 and 245 in the antenna device 240. That is, the first variable reactance device 251 is connected to the first open end 243 such that the first resonance frequency band may be changed. The second variable reactance device 253 is connected to the second open end 245 such that the second resonance frequency band may be changed.

That is, the control unit 130 controls the strength of the signal, such as a voltage and then, applies the signal to the variable reactance device 250, so that the reactance of the variable reactance device 250 is changed. For example, the control unit 130 may adjust the strength of the signal to one in the range of 2 V to 6 V. In response, the reactance of the variable reactance device 250 may be changed into one in the range of 0.3 pF to 0.5 pF. In this case, if the control unit 130 controls the strength of the signal to 2 V, the reactance of the variable reactance device 250 may be changed into 0.3 pF. If the control unit 130 controls the strength of the signal to 16 V, the reactance of the variable reactance device 250 may be changed into 0.5 pF.

Figure 4:
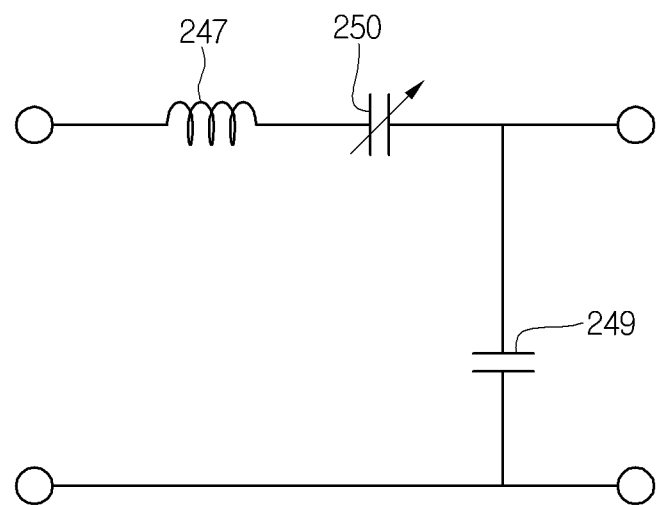
FIG. 4 is a circuit diagram showing a circuit equivalent to the antenna apparatus according to the embodiment.

FIG. 4 is a circuit diagram showing a circuit equivalent to the antenna apparatus according to the embodiment.

Referring to FIG. 4, the antenna apparatus 110 according to the embodiment has a fixed inductance, a fixed reactance and a variable reactance. That is, the antenna apparatus 110 is designed such that the antenna device 240 has the fixed inductance and reactance. In the equivalent circuit, the fixed inductance and reactance are expressed as a fixed inductor 247 and a fixed capacitor 249. The antenna device 240 is connected to the variable reactance device having a variable reactance. In the equivalent circuit, the fixed inductor 247 is connected in series to the variable reactance device 250. The fixed capacitor 249 is connected in parallel to the fixed inductor 247 and the variable reactance device 250.

In this case, the fixed inductance and capacitance of the antenna apparatus 110 are determined according to the size or shape of the antenna device 240. For example, the fixed inductance may be determined according to the size, that is, a length and a width of the antenna device 240. In addition, the fixed capacitance may be determined according to the interval between the antenna device 240 and the ground member 220 and the overlap area of the antenna device 240 with respect to the ground member 220.

Figure 5:
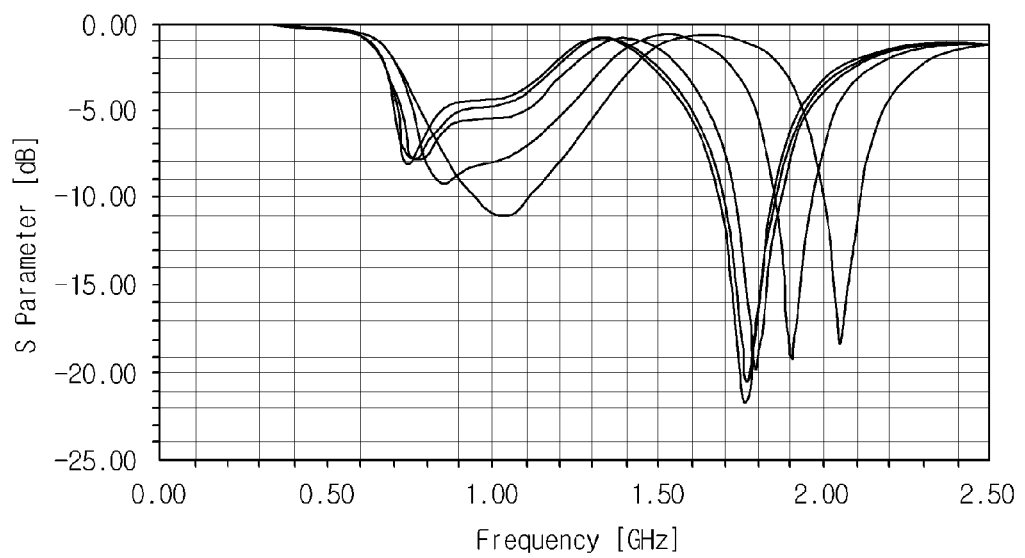
FIG. 5 is a graph illustrating an operation characteristic of a first example of the antenna apparatus according to the embodiment.

FIG. 5 is a graph illustrating an operation characteristic of a first example of the antenna apparatus according to the embodiment. FIG. 5 shows variation of an S parameter according to a frequency band. The S parameter is a factor signifying a voltage ratio between input and output (output voltage/input voltage) at a specific frequency band, and is expressed as dB scale.

Referring to FIG. 5, the antenna apparatus 110 operates at the first and second resonance frequency bands. Compared with the second resonance frequency band, the first resonance frequency band corresponds to a low frequency band. Similarly, compared with the first resonance frequency band, the second resonance frequency band corresponds to a high frequency band. As the antenna apparatus 110 includes one variable reactance device 250, the first and second resonance bands of the antenna apparatus 110 are adjusted. That is, as the reactance of the variable reactance device 250 varies, the first and second resonance frequency bands may be collectively changed in the antenna apparatus 110.

Figure 6:
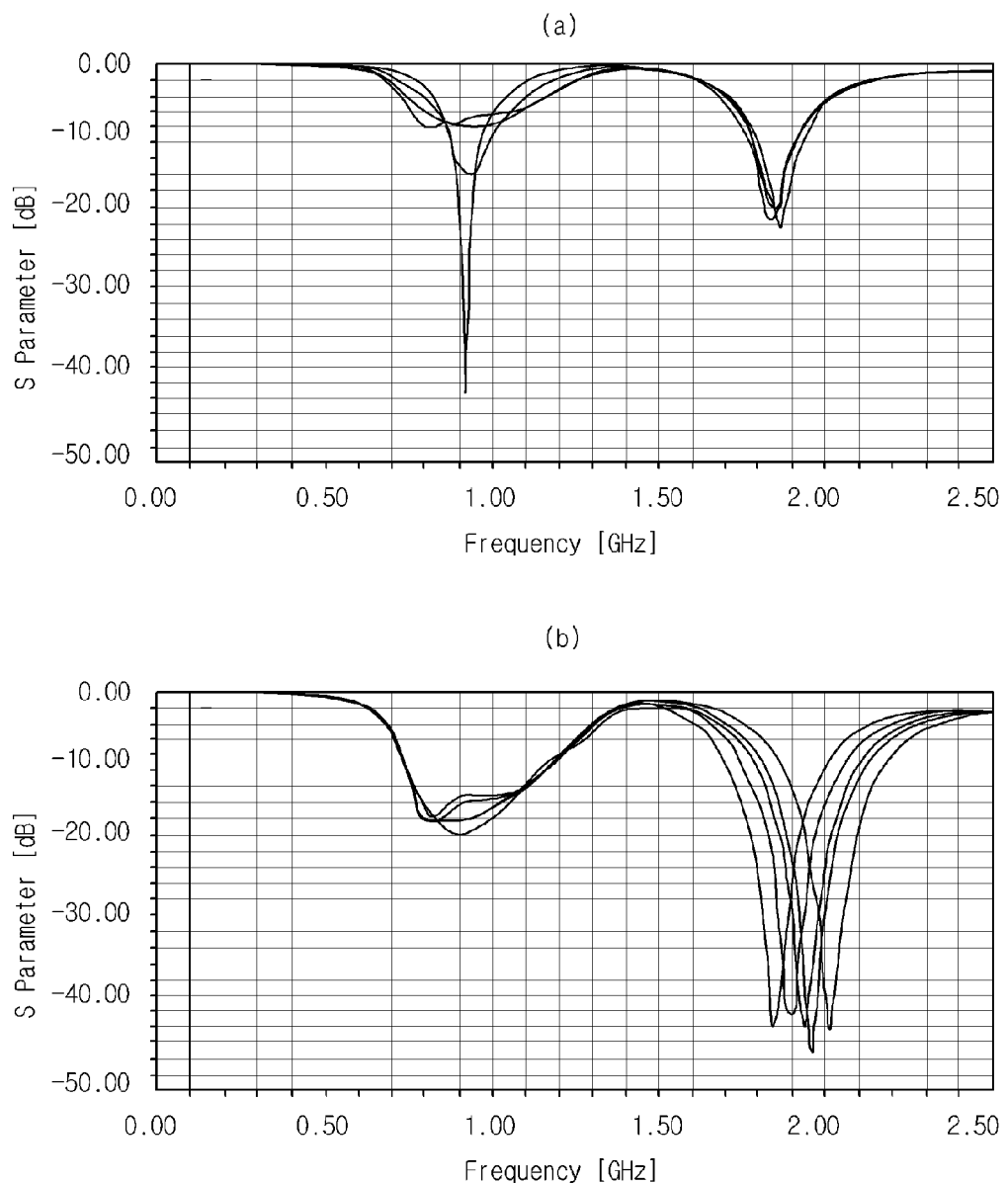
FIG. 6 is a graph illustrating an operation characteristic of a second example of the antenna apparatus according to the embodiment.

FIG. 6 is a graph illustrating an operation characteristic of a second example of the antenna apparatus according to the embodiment. FIG. 6 shows variation of an S parameter according to a frequency band.

Referring to FIG. 6, the antenna apparatus 110 operates at the first and second resonance frequency bands. Compared with the second resonance frequency band, the first resonance frequency band corresponds to a low frequency band. Similarly, compared with the first resonance frequency band, the second resonance frequency band corresponds to a high frequency band. As the antenna apparatus 110 includes the first and second variable reactance devices 251 and 253, at least one of the first and second resonance bands of the antenna apparatus 110 is adjusted. That is, as the reactance of the first variable reactance device 251 varies, the first resonance frequency band of the antenna apparatus 110 may be changed in the antenna apparatus 110 as shown in (a) of FIG. 6. In addition, as the reactance of the second variable reactance device 253 varies, the second resonance frequency band of the antenna apparatus 110 may be changed in the antenna apparatus 110 as shown in (b) of FIG. 6.

Figure 7:
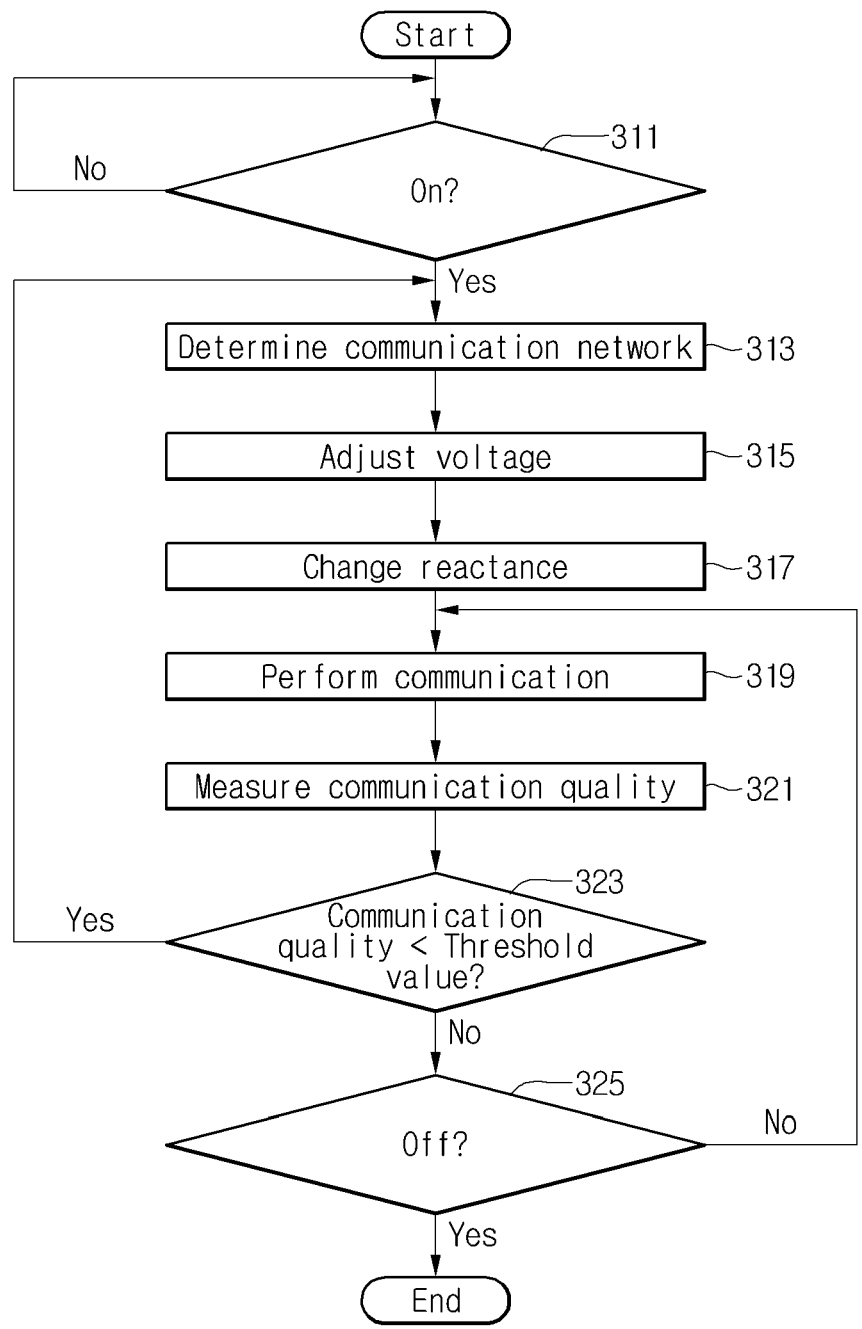
FIG. 7 is a flowchart illustrating an operation process of a communication terminal according to the embodiment.

FIG. 7 is a flowchart illustrating an operation process of a communication terminal according to the embodiment.

Referring to FIG. 7, the operation process of the communication terminal 100 starts from sensing a power-on of the wireless communication unit 120 in step 311. When the communication terminal 100 is powered on, the control unit 130 may allow the wireless communication unit 120 to be powered on. According to a request individually input in a state that the communication unit 100 is powered on, the control unit 130 may allow the wireless communication unit 120 to be powered on.

Next, the control unit 130 determines one of a plurality of communication networks in step 313. In this case, the control unit 130 may determine one of the communication networks in a predetermined priority order. The memory 140 may store the communication networks in correspondence to the priority order. The control unit 130 may determine one of the communication networks corresponding to a current location of the communication terminal 100. The memory 140 may store the communication networks corresponding to location information supporting each communication network.

Next, the control unit 130 adjusts a strength of a signal corresponding to a specific communication network in step 315. That is, the control unit 130 applies a signal having a predetermined strength corresponding to the specific communication network to the variable reactance device 250 of the antenna apparatus 110. The memory 140 stores strengths of predetermined signals corresponding to each communication network. Then, the variable reactance device 250 of the antenna apparatus 110 changes the reactance corresponding to the strength of the specific signal in step 317. The impedance of the antenna apparatus 110 varies corresponding to the reactance variation. The resonance frequency band of the antenna apparatus 110 varies corresponding to the impedance variation.

Next, in step 319, the control unit 130 accesses to a specific communication network to perform communication. That is, as the antenna apparatus 110 operates at the resonance frequency band, the control unit 130 communicates with a specific communication network through the antenna apparatus 110. In this case, when communicating with the specific communication network, the control unit 130 continuously applies the signal at the current strength to the antenna apparatus 110. Thus, the reactance of the variable reactance device 250 of the antenna apparatus 110 is continuously maintained.

Next, while communicating through the specific communication network in step 319, the control unit 130 measures a communication quality of the specific communication network in step 321. In this case, the control unit 130 measures an RSSI (Received Signal Strength Indication) of the specific communication network so that the communication quality may be grasped. The control unit 130 may periodically measure the communication quality. The control unit 130 may measure the communication quality in response to occurrence of a preset event. In step 323, the control unit 130 determines whether the communication quality is less than a preset threshold value. In this case, the threshold value may be previously stored in the memory 140. The memory 140 may previously store threshold values corresponding to each communication network.

If it is determined in step 323 that the communication quality is less than the threshold value, the control unit 130 repeatedly performs steps 323 to 323. That is, the control unit 130 selects another one of the communication networks to change the communication network for access. The control unit 130 controls the signal strength corresponding to the specific communication network such that the reactance of the variable reactance device 250 varies. Thus, the resonance frequency band of the antenna apparatus 110 varies corresponding to the specific communication network. Then, the control unit 130 accesses to the specific communication network to perform communication. The control unit 130 may repeatedly perform the steps 313 to 323 until it is determined in step 323 that the communication quality is less than the threshold value.

Last, if the wireless communication unit 120 is powered off, the control unit 130 senses the fact to terminate the operation process of the communication terminal 100. In a state that it is determined in step 323 that the communication quality is not less than the threshold value, the wireless communication unit 120 may be powered off. In this case, when the communication terminal 100 is powered off, the control unit 130 may allow the wireless communication unit 120 to be powered off. The control unit 130 may allow the wireless communication unit 120 to be powered off according to a request individually input in the state that the communication terminal 100 is powered on.

Meanwhile, if the wireless communication unit 120 is not powered off in step S325, the control unit 130 may return to step 319. That is, the control unit 130 may continuously perform communication. Then, the control unit 130 repeatedly performs at least a part of steps 313 to 325. In this case, the control unit 130 may repeatedly perform at least some of steps 313 to 325 until the wireless communication unit 120 is powered off in step 325.

For example, the memory 140 may have stored a first strength corresponding to a first communication network and a second strength corresponding to a second communication network. When the first communication network is determined, the control unit 130 may apply a signal having the first strength to the variable reactance device 250. In addition, the control unit 130 may access to the first communication network to perform communication. If the communication quality of the first communication network is deteriorated lower than the threshold value during communication through the first communication network, the control unit 130 may change the communication network to the second communication network. When the second communication network is determined, the control unit 130 may apply a signal having the second strength to the variable reactance device 250. In addition, the control unit 130 may access to the second communication network to perform communication. In this case, if the communication quality of the second communication network is deteriorated lower than the threshold value during communication through the second communication network, the control unit 130 may change the communication network to the first communication network. That is, the control unit 130 may determine the first communication network again.

Meanwhile, although the above-described embodiment discloses an example that the antenna device 240 is mounted on the mounting member 230 so that the antenna device 240 is mounted on the drive substrate 210, the embodiment is not limited thereto. That is, even though the antenna device 240 is directly mounted on the drive substrate 210, it is possible to prepare the embodiment. In this case, the antenna device 240 adheres to the drive substrate 210.

According to the embodiment, since the reactance of the variable reactance device 250 may vary, the resonance frequency band of the antenna apparatus 110 may vary. Thus, the resonance frequency band of the antenna apparatus 110 is expanded. So, the communication terminal 100 may use more expanded resonance frequency band through the antenna apparatus 110. In addition, the communication terminal 100 may access to a plurality of communication networks. Therefore, since there is no need to install a plurality of antenna apparatuses 110 to the communication terminal 100, the communication terminal 100 may be miniaturized.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An antenna apparatus comprising:
   an antenna device including a feeding point to which a signal is applied; and
   at least one variable reactance device connected to the antenna device,
   wherein the variable reactance device comprises:
   a first variable reactance device connected to a first open end of the antenna device to change a first resonance frequency band at which the antenna device is operated; and
   a second variable reactance device connected to a second open end of the antenna device to change a second resonance frequency band at which the antenna device is operated, and
   wherein the feeding point is disposed between the first variable reactance device and the second variable reactance device.

2. The antenna apparatus of claim 1, wherein the variable reactance device is connected to a position of the antenna device where a density of the signal is highest.

3. The antenna apparatus of claim 1, wherein the variable reactance device is connected to an open end of the antenna device.

4. The antenna apparatus of claim 3, wherein the antenna device comprises a plurality of ends, one of the ends is the feeding point, and at least one of the remaining ends is the open end.

5. The antenna apparatus of claim 1, wherein a reactance of the variable reactance device varies according a strength of a signal applied to the variable reactance device.

6. The antenna apparatus of claim 1, wherein the variable reactance device changes at least one resonance frequency band at which the antenna device is operated.

7. The antenna apparatus of claim 1, wherein the antenna device operates in multiple frequency bands, and
   wherein the first resonance frequency has a low frequency and the second resonance frequency has a high frequency.

8. A communication terminal comprising:
   an antenna apparatus including an antenna device and at least one variable reactance device connected to the antenna device, in which the antenna device includes a feeding point to which a signal is applied; and
   a control unit configured to:
   control a strength of a signal applied to the variable reactance device according to a communication network to access and for driving the antenna apparatus to access to the communication network, and
   apply a strength of a first signal, which is preset corresponding to a first communication network, to the variable reactance device when accessing to the first communication network, and apply a strength of a second signal, which is preset corresponding to a second communication network, to the variable reactance device when accessing to the second communication network,
   wherein the variable reactance device comprises:

a first variable reactance device connected to a first open end of the antenna device to change a first resonance frequency band at which the antenna device is operated; and a second variable reactance device connected to a second open end of the antenna device to change a second resonance frequency band at which the antenna device is operated, and wherein the feeding point is disposed between the first variable reactance device and the second variable reactance device.

9. The communication terminal of claim 8, wherein the variable reactance device is connected to a position of the antenna device where a density of the signal is highest.

10. The communication terminal of claim 8, wherein the control unit changes the communication network when a communication quality of the communication network is deteriorated lower than a preset threshold value.

* * * * *